US006642487B2

United States Patent
Stanzel

(10) Patent No.: US 6,642,487 B2
(45) Date of Patent: Nov. 4, 2003

(54) HEATING ARRANGEMENT

(75) Inventor: Erwin Stanzel, Linsengericht (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 10/157,559

(22) Filed: May 28, 2002

(65) Prior Publication Data

US 2003/0010771 A1 Jan. 16, 2003

Related U.S. Application Data

(63) Continuation of application No. PCT/GB00/04408, filed on Nov. 20, 2000.

(30) Foreign Application Priority Data

Nov. 26, 1999 (GB) .............................................. 9928050

(51) Int. Cl.$^7$ ................................................ H05B 1/02
(52) U.S. Cl. ........................ 219/494; 219/497; 219/213; 219/214; 219/219; 374/102; 340/580
(58) Field of Search ................................ 219/211, 219, 219/213, 217, 218, 497, 494, 501, 505, 508, 214; 340/581, 582, 603, 945; 374/102; 244/134 D, 134 F; 392/435

(56) References Cited

U.S. PATENT DOCUMENTS 4,365,131 A * 12/1982 Hansman, Jr. .............. 340/581
4,432,211 A * 2/1984 Oishi et al. .................. 219/497
4,581,522 A * 4/1986 Graham ....................... 219/545
5,418,522 A 5/1995 Freundlieb et al.
6,297,475 B2 * 10/2001 Jones .......................... 219/213

FOREIGN PATENT DOCUMENTS

FR 2789034 * 8/2000

* cited by examiner

*Primary Examiner*—Mark Paschall
(74) *Attorney, Agent, or Firm*—Akin, Gumo, Strauss, Hauer & Feld, L.L.P.

(57) ABSTRACT

An apparatus for preventing the formation of ice on a substrate exposed to an outdoor environment or for preventing condensation of moisture in a cabinet for electrical equipment includes a sensor for measuring the temperature of the ambient air around the substrate or around or in the cabinet and calculates the rate of change of the temperature of the ambient air. The apparatus further includes a sensor for measuring the temperature of the substrate or of a surface of or inside the cabinet. A heater supplies heat to the substrate or cabinet in response to pre-arranged conditions dependent on the outputs of the sensors and on the calculated rate of change of the temperature of the ambient air. The apparatus for preventing condensation may optionally omit the sensor for measuring the temperature of a surface of or inside the cabinet.

28 Claims, 1 Drawing Sheet

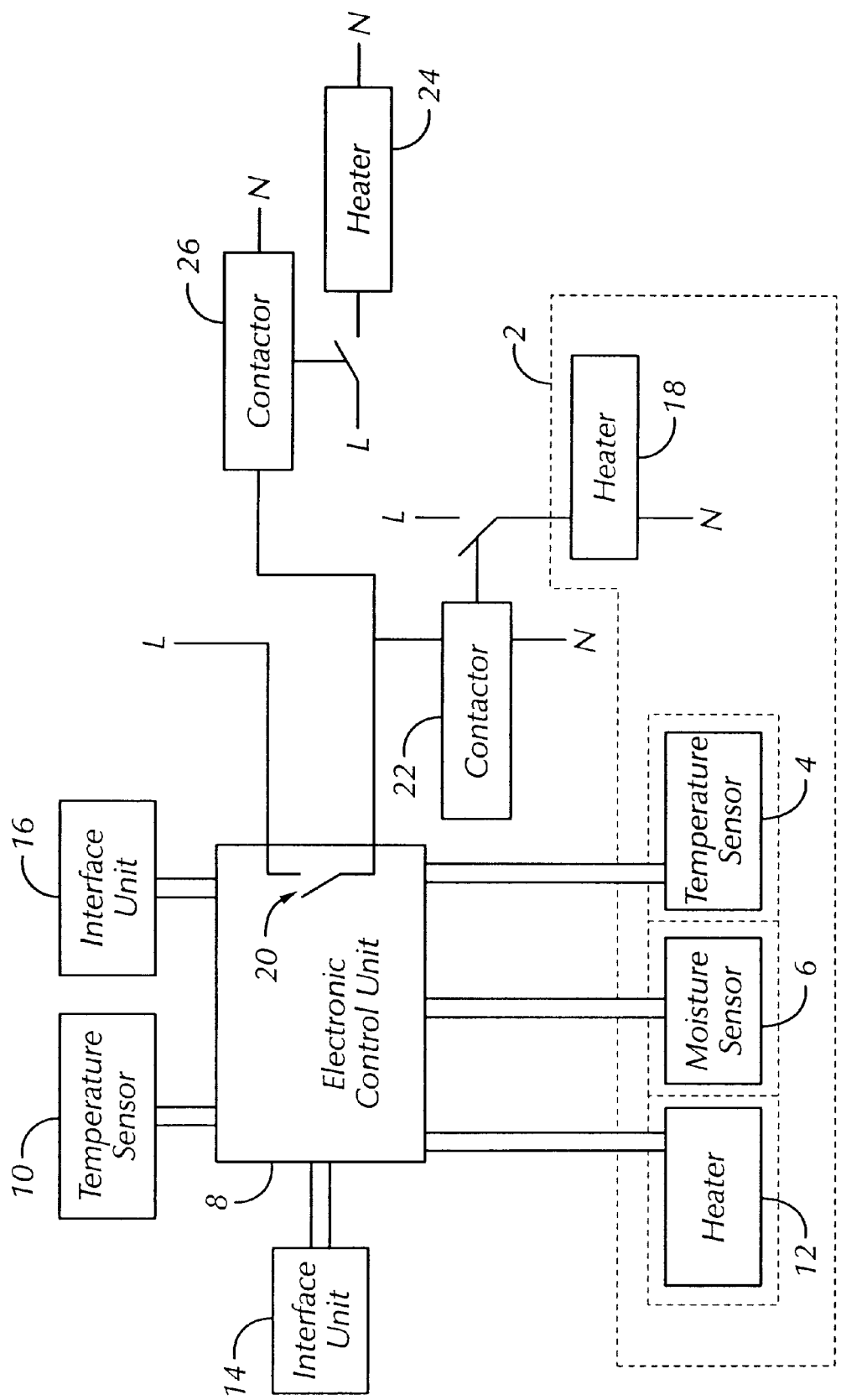

HEATING ARRANGEMENT

CROSS-REFERENCE TO RELATED APPLICATIONS

This application is a continuation of International Application No. PCT/GB00/04408, filed Nov. 20, 2000, which was published in the English language on May 31, 2001, under International Publication No. WO 01/39549 A1, and the disclosure of which is incorporated herein by reference.

BACKGROUND OF THE INVENTION

This invention relates to a heating arrangement, and in particular to apparatus for preventing the formation of ice on a substrate that is exposed to an outdoor environment.

The ViaGard™ heating system available from Raychem HTS provides a polymeric self regulating heater that may be embedded in driveways, pathways or steps, for example, so that heating can be supplied to prevent the formation of ice thereon, or to melt any fallen snow. Control of the ViaGard™ heating system is effected by utilizing the outputs from sensors that are embedded in the substrate, for example a concrete slab, that detect the temperature and any moisture present in the substrate. Thus, when the sensed temperature is detected as being below predetermined values and in the presence of moisture, the electrical supply to the heater is switched on. There are weather conditions, however, in which the response of such a system is not good enough, resulting either in the heater being switched or kept on unnecessarily, or in not being switched on soon enough.

BRIEF SUMMARY OF THE INVENTION

An object of the present invention to provide improved heating of an outdoor substrate to prevent or at least to alleviate the formation of ice thereon.

In accordance with one aspect of the present invention, there is provided apparatus for preventing the formation of ice on a substrate exposed to an outdoor environment, the apparatus comprising a sensor for measuring the temperature of the ambient air around the substrate, a sensor for measuring the temperature of the substrate, preferably a sensor for detecting the presence of moisture on the substrate, and a heater arranged to supply heat to the substrate in response to pre-arranged conditions dependent on the outputs of the said sensors.

In another aspect of the invention, the temperature and moisture sensing may be carried out on a test substrate and, under conditions conducive to the formation of ice thereon, heating may be applied to another, neighboring substrate on which the formation of ice is to be prevented. Furthermore, detection of conditions conducive to the formation of ice on one substrate may be arranged to provide heating to two or more neighboring substrates, which may be considered as susceptible to formation of ice thereon.

The substrate or substrates may be a pathway or driveway, especially if inclined, or steps, associated with a building, for example. The heating control of the present invention, however, may be applied to sports grounds, for example, where hot water pumped through pipes, which may be embedded in the ground, provides a preferred heater.

The output signals from the temperature sensors and from the moisture sensor may be supplied to an electronic control unit in which is stored an algorithm which has been predetermined so as to activate the heater of the apparatus under conditions regarded as conducive to the formation of ice.

In accordance with another aspect of the present invention, a method is provided for preventing ice formation on a substrate exposed to an outdoor environment. Heat is applied to the substrate in an amount dependent on pre-arranged conditions derived from measurement of the temperature of the ambient air around the substrate, the temperature of the substrate, and preferably the presence of moisture on the substrate.

The processing of the sensed parameters in the control unit can thus be arranged to lead to activation of the heating of the substrate prior to the occurrence of rain or snow. This contrasts with known ice protection systems, in which under certain conditions the heating is activated only after the formation of ice. For example, in the event of extremely cold weather, for example −15° C., for several days without there being any snow, the substrate can freeze down to that low temperature. Should the air temperature then rise rapidly, for example up to zero degrees within a few hours, and should rain occur, the heating of the substrate will be slow to dispel the ice because of the thermal inertia that has to be overcome.

The control unit for the heater of the present invention can be arranged to take into account not only the absolute values of temperature and moisture, but also the rate of change of temperature, for example.

The apparatus may also comprise a sensor for measuring the relative humidity of the ambient air around the substrate, wherein activation of the heater is responsive to the output of the humidity sensor. Furthermore, the apparatus may comprise a sensor for measuring the pressure of the ambient air around the substrate, and activation of the heater may then be responsive to the output of the pressure sensor.

It will be appreciated that the time and/or the power output of the heater may be controlled in response to the measured parameters and/or their rate of change.

The moisture sensor is preferably one that itself is heated, so as to avoid false output signals therefrom. Advantageously, the amount of heat applied thereto is arranged to be substantially equal to heat loss therefrom to its surroundings. Thus, in accordance with another aspect of the present invention, a moisture sensor is heated by means of an electrical resistance heater, for example a self regulating or constant wattage heater cable, in such a way as to compensate for the heat loss of the sensor to the surrounding substrate and air. The ambient temperature is sensed by a separate temperature sensor. A proportional ambient sensing control algorithm is then used, such that the heater of the moisture sensor is switched on full (100% heating) at the minimum design temperature for the associated heating apparatus, for example −20° C., and may be linearly reduced to zero percent (i.e. switched off) at a further predetermined temperature, for example +3° C. The switching of the heating element may be controlled by a triac, a solid state relay, or an electromechanical relay, for example.

Weather conditions such as cold nights interspersed with warm days may give rise to unnecessary operation of the heater, that is to say, under conditions when in fact rain or snow leading to the formation of ice is not expected. Control of the heater may thus include an algorithm, whereby the requirement must also be met that the substrate has been sensed to be at less than a predetermined temperature, of say −8° C., for a minimum time, of say 24 hours, before the heater is activated.

Additionally or alternatively, control of the heater of the apparatus may be responsive to information received remotely, for example from a weather forecasting service.

Preferably, heating of the substrate is effected by a self regulating, preferably polymeric, electrical heater, which may advantageously be embedded in the substrate or other component to be heated. Electrical heating may alternatively be provided by a constant wattage heater. It is also envisaged, however, that the substrate may be heated by means of hot water, flowing through pipework.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

The sole FIGURE is a schematic electrical system diagram of a heating arrangement according to the invention, used to heat a ramped concrete driveway.

DETAILED DESCRIPTION OF THE INVENTION

The drawing shows a ramped concrete driveway 2 having a temperature sensor 4 and a moisture sensor 6 embedded therein. The outputs from the sensors 4 and 6 are supplied to an electronic control unit 8 containing a microprocessor. A temperature sensor 10 is located in the vicinity of the driveway 2 to determine the local air temperature, and the output from the sensor 10 is also supplied to the electronic control unit 8. The moisture sensor 6 has two electrodes, and a determination of the resistance between them is made by the control unit 8 as a measure of the presence of moisture. In order to ensure that ice, which is non-conductive and could thus give a false reading, is not formed from any moisture between the electrodes, the sensor 6 is heated by a proportional ambient sensing controlled heater 12. It will be appreciated that the heater 12 and the substrate temperature sensor 4 have to be thermally isolated from each other.

The microprocessor within the control unit 8 applies not only the absolute values of the parameters detected by the sensors 4, 6 and 10, but also the rate of change of the air temperature as detected by the sensor 10. An algorithm is stored in the microprocessor to which the measured and calculated values are applied. One suitable algorithm, which is effective independently of the presence of moisture in the substrate 2, is:

$$T_{air} > T_{substrate} + 2 \text{ Kelvin } (°K.), \text{ and}$$

$$T_{substrate} < -3° C.$$

A further suitable algorithm includes, in addition to the two criteria set out above, the additional feature that:

$$\frac{dT_{air}}{dt} > 2 \text{ Kelvin } (°K)/hour.$$

In the latter case, then in the event, and only in the event, that the three conditions of the algorithm are fulfilled, the control unit 8 switches on a heater 18 that is embedded in the driveway 2. The heater 18 is a polymeric self-regulating heater, and is activated via an output relay 20 and a contactor 22.

A still further algorithm adds to any of the algorithms above the criterion that the sensed temperature of the driveway must have been at <−8° C. for at least 24 hours.

An alternative algorithm may be arranged to ensure that the driveway heater 18 is always switched on either whenever the above algorithm is fulfilled, or when the moisture sensor 6 senses moisture and the substrate temperature sensor 4 senses a temperature of <+3° C.

The apparatus also includes an optional interface unit 14, which receives information relating to weather conditions in the geographical area in which the driveway 2 is situated, and feeds this information into the control unit 8. The control unit 8 can use the information received by the unit 14 from a weather bureau either to supplement or to override the input received from the local sensors 4, 6 and 10.

A further optional interface unit 16 can be linked into a management system of the building with which the driveway 2 is associated, for example to override operation of the heater 18 and/or 12 in certain circumstances.

The control unit 8 and the heater control signal outputted therefrom, in response to the sensors 4, 6 and 10, or the unit 14, or the unit 16, can also be used to activate heating of substrates other than the driveway 2. It is envisaged that such other substrates would also be subject to the same local weather conditions as the driveway 2, and may for example, comprise outdoor steps or pathways of an associated building. Thus, as shown in the drawing, a further heater 24 can be activated by the control unit 8 via the output relay 20 and a further contactor 26.

It will be appreciated that the formation of ice on a substrate, such as the driveway 2, will depend on the material of which the driveway is formed, and the algorithm that is set up in the microprocessor of the control unit can be arranged to take this into account.

Although mention has been made of only a single algorithm stored in the control unit 8, it is envisaged that a set of different algorithms may be stored within the unit 8. The particular algorithm selected by the operator may depend on the geographical area and criticality that is required for use. Furthermore, the parameters of the or each algorithm that act as trigger values, for example the values 2 K, −3° C., 2 K/hour, 24 hours, −8° C., and +3° C. of the algorithms exemplified above, may be adjusted to suit local operating conditions.

The moisture sensor exemplified by the sensor 6 consists of two electrodes which detect the presence of the conductive material, for example melted snow, between them. The electrodes must be kept at a temperature slightly above the freezing point, since crystalline water is not electrically conductive. However, the temperature of the electrodes should not be kept so far above the freezing point as to vaporize the moisture and dry the surface of the sensor, which would lead to false results. Complex control circuits with several temperature sensors are presently used to maintain the temperature of the electrodes at a suitable level, for example as described in U.S. Pat. No. 5,418,522 and German Patent DE 40 32 734 C. However, in accordance with the moisture sensor of the present invention, the heating applied thereto is dependent on the heat loss to the surrounding, for example the substrate and the ambient air, taking into account the temperatures measured by the sensors 4 and 10.

The arrangements described above could also be used for early detection of circumstances which might lead to harmful condensation in cabinets for electrical power distributions, for telecom uses, for traffic lights, for train ticket cabinets, and for all other electrical enclosures which are typically installed outside, and for prevention of such condensation by switching on a heating device. In such uses, the sensor for measuring the temperature of the substrate might not be necessary.

It is known to remove condensation in such enclosures by means of a single point thermostat, which turns a heater on at a certain set point. This has the disadvantage that condensation which is harmful to electric/electronic arrangements might have already occurred before the heater is turned on. Critical situations include:

A) Low temperature for a long period of time, causing the electronic/electric arrangements to be at low temperature, followed by rapid increase of outdoor temperature. Due to the thermal mass of the electronic/electric arrangements, their surface will be colder than the warming air so that condensation might occur;

B) High temperature for long period of time, causing the electronic/electric arrangements and the cabinet wall to be at high temperature, followed by rapid decrease of outdoor air temperature. Condensation might occur on the inside of the cabinet wall.

Using the air temperature sensor described above according to the present invention, calculating the rate of change (dT/dt), and consequently switching the heating element on, if Idt/dtI is greater than a given set point, will prevent condensation before it occurs in both critical cases.

Measuring the relative humidity and its rate of change can be used to help in optimizing the decision process to switch the heater on at the right time. The temperature sensor, which senses the temperature of the substrate, could preferably be included and used also to assist such optimization.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An apparatus for preventing formation of ice on a substrate exposed to an outdoor environment, the apparatus comprising a first sensor for measuring a temperature of ambient air around the substrate, means for calculating a rate of change of the temperature of the ambient air, a second sensor for measuring a temperature of the substrate, and a heater arranged to supply heat to the substrate in response to pre-arranged conditions dependent on outputs of the first and second sensors and on the calculated rate of change of the temperature of the ambient air.

2. The apparatus according to claim 1, further comprising a moisture sensor for detecting presence of moisture on the substrate.

3. The apparatus according to claim 2, further comprising means for applying heat to the moisture sensor to prevent formation of ice thereon to avoid false output therefrom.

4. The apparatus according to claim 3, wherein an amount of heat applied to the moisture sensor is substantially equal to heat loss therefrom to its surroundings.

5. The apparatus according to claim 2, wherein heat is supplied to at least one of the substrate and the moisture sensor by means of a self-regulating, polymeric electrical heater.

6. The apparatus according to claim 1, further comprising a humidity sensor for measuring relative humidity of the ambient air around the substrate, and wherein activation of the heater is responsive to an output of the humidity sensor.

7. The apparatus according to claim 1, further comprising a pressure sensor for measuring pressure of the ambient air around the substrate, and wherein activation of the heater is responsive to an output of the pressure sensor.

8. The apparatus according to claim 1, wherein activation of the heater is responsive to a rate of change of at least one other measured parameter selected from the group consisting of moisture, relative humidity and air pressure.

9. The apparatus according to claim 1, wherein at least one of operating time and power output of the heater is controlled by means responsive to at least one of measured parameters and their rate of change.

10. The apparatus according to claim 1, wherein heat is supplied to the substrate by one of a constant wattage electric heater and heated water.

11. An apparatus for preventing condensation of moisture in a cabinet for electrical equipment, the apparatus comprising a sensor for measuring a temperature of ambient air around or in the cabinet, means for calculating a rate of change of the temperature of the ambient air, and a heater arranged to supply heat to the cabinet in response to pre-arranged conditions dependent on outputs of the sensor and on the calculated rate of change of the temperature of the ambient air.

12. The apparatus according to claim 11, further comprising a moisture sensor for detecting presence of moisture in the cabinet.

13. The apparatus according to claim 12, further comprising means for applying heat to the moisture sensor to prevent formation of ice thereon to avoid false output therefrom.

14. The apparatus according to claim 13, wherein an amount of heat applied to the moisture sensor is substantially equal to heat loss therefrom to its surroundings.

15. The apparatus according to claim 12, wherein heat is supplied to at least one of the cabinet and the moisture sensor by means of a self-regulating, polymeric electrical heater.

16. The apparatus according to claim 11, further comprising a humidity sensor for measuring relative humidity of the ambient air around or in the cabinet, and wherein activation of the heater is responsive to an output of the humidity sensor.

17. The apparatus according to claim 11, further comprising a pressure sensor for measuring pressure of the ambient air around or in the cabinet, and wherein activation of the heater is responsive to an output of the pressure sensor.

18. The apparatus according to claim 11, wherein activation of the heater is responsive to a rate of change of at least one other measured parameter selected from the group consisting of moisture, relative humidity and air pressure.

19. The apparatus according to claim 11, wherein at least one of operating time and power output of the heater is controlled by means responsive to at least one of measured parameters and their rate of change.

20. The apparatus according to claim 11, wherein heat is supplied to the cabinet by a constant wattage electric heater.

21. A method for preventing ice formation on a substrate exposed to an outdoor environment or for preventing condensation of moisture in a cabinet for electrical equipment, the method comprising supplying heat to the substrate or cabinet in an amount dependent on pre-arranged conditions derived from measurement of (a) a temperature of ambient air around the substrate or in or around the cabinet, and (b) a rate of change of the temperature of the ambient air, and (c) in a case of prevention of ice formation on the substrate, a temperature of the substrate, which conditions forecast the condensation of moisture in the cabinet or the formation of ice on the substrate.

22. The method according to claim 21, wherein an amount of heat supplied to the substrate or cabinet is dependent on a presence of moisture on the substrate or in the cabinet.

23. The method according to claim 21, wherein an amount of heat supplied to the substrate or cabinet is dependent on a relative humidity of the ambient air around the substrate or around or in the cabinet.

24. The method according to claim 21, wherein an amount of heat supplied to the substrate or cabinet is dependent on a pressure of the ambient air around the substrate or around or in the cabinet.

25. The method according to claim 21, wherein an amount of heat supplied to the substrate or cabinet is dependent on a rate of change of at least one other measured parameter selected from the group consisting of moisture, relative humidity and air pressure.

26. The method according to claim 21, wherein heat is applied to a moisture sensor used to detect moisture on the substrate or in the cabinet to prevent formation of ice on the moisture sensor.

27. The method according to claim 26, wherein heat loss from the moisture sensor to its surroundings is determined and an amount of heat applied to the moisture sensor is substantially equal to the heat loss.

28. The method according to claim 21, wherein information concerning a value of at least one measured parameter is supplied from a location remote from the substrate or cabinet and is used to control supply of the heat to the substrate or cabinet.

* * * * *